Aug. 28, 1934.  H. R. PENNINGTON  1,972,067
COATED WELDING ELECTRODE
Filed June 16, 1933

Inventor
HARRY R. PENNINGTON,
By
Attorneys

Patented Aug. 28, 1934

1,972,067

UNITED STATES PATENT OFFICE 1,972,067

COATED WELDING ELECTRODE

Harry R. Pennington, Muncie, Ind., assignor to Indiana Steel & Wire Company, Muncie, Ind., a corporation of Indiana Application June 16, 1933, Serial No. 676,067

9 Claims. (Cl. 219—8)

It is the object of my invention to provide a coated welding electrode which makes possible welds of high tensile strength and high ductility and substantially free from inclusions of oxides and nitrides and from gas holes and slag pockets; and which will permit a high rate of deposition and at the same time give such depth of fusion that a weld deposit of proper contour is obtained.

In accomplishing this result, I include in the coating, in addition to any desired or usual fluxing and/or slag-forming ingredients, a substantial quantity of gum arabic (gum acacia), sufficient so that it forms at least 8% of the total, and desirably between 10% to 25% thereof, and permissibly as high as 50% to 75% thereof especially in thin coatings. The coating may be either a thick coating or a thin coating, and is applicable both for positive-connected electrodes and negative-connected electrodes.

The gum acacia serves a number of functions:

1. On being raised to the temperature incident to welding, it burns to produce oxides of carbon, probably both carbon monoxide and carbon dioxide; which serve to shield the arc, and the weld which is being formed from contact with the air and from the inclusion of oxides and nitrides as well as from oxidation. This is of course more pronounced in thick coatings, but exists to an appreciable extent in thin coatings.

2. It holds its solid form, with substantially no melting, up to the temperature where it burns to form carbon oxides; and thus serves to hold the coating in place substantially down to the point where the electrode wire is melting into the arc, and in thick coatings usually even somewhat beyond that so that the arc is kept within an inverted crater formed by the protruding shell of gum-supported coating.

3. In itself it serves as a binder, both when the electrode is hot and when it is cold, and assists the action of any other binder present. In doing this the gum arabic may form a sort of coating-supporting honeycomb shell or matrix; by being dissolved in water or in a solution of sodium silicate or potassium silicate to make the coating paste, and being deposited from such solution on evaporation of water.

4. It serves as a friction-reducer when paste is used to form the flux coating, and facilitates extrusion of the paste when the coating is applied by extrusion.

Figure 1:
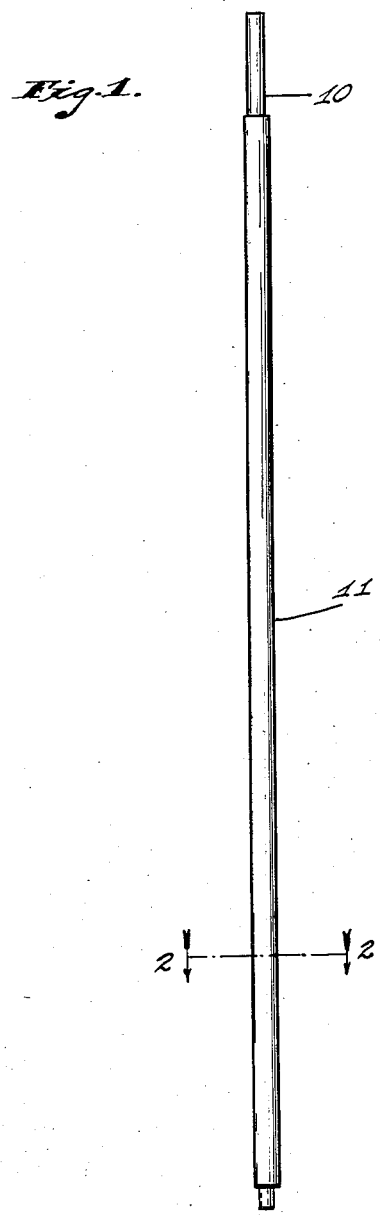
Figure 2:

The accompanying drawing shows a coated rod embodying my invention: Fig. 1 is an elevation of a coated welding rod; and Fig. 2 is a cross-section thereof, on the line 2—2 of Fig. 1.

In such drawing, the metallic wire or rod 10 is covered for all or the greater part of its length by a dried and baked coating 11 which contains gum arabric (gum acacia) as an essential ingredient.

The gum arabic or gum acacia may be combined in various ways with other ingredients to form the complete coating. Great variation may be made in the other ingredients used.

The following are examples:

Example 1

| Ingredients | Percentage by weight |
|---|---|
| | Percent |
| Gum arabic | 15 |
| Sodium silicate (liquid) | 25 |
| Ferromanganese | 10 |
| Silica flour | 10 |
| Magnesium silicate (such as talc) | 10 |
| Aluminum silicate (such as kaolin) | 30 |

The solid ingredients, desirably in powdered form, are suitably mixed in dry form, and then mixed thoroughly into the liquid sodium silicate. Some water may be added, if desired, to obtain a thinner consistency, although this is wholly optional; for it is desirable that the paste be of such consistency that it may be extruded through dies in a known manner to form a coating sleeve about the welding-rod wire, although the coating may also be applied in other ways, such as dipping. The sodium silicate added may be in solid form, if desired, but in that case water is added to produce a solution. The gum arabic may be added either as a solid or in water solution, for it is very soluble. The thickness of the coating may vary, but with this type of coating it usually does not exceed 1/32 of an inch for a wire of 3/16 inch diameter, a commonly used size for welding rods.

Example 2

| Ingredients | Percentage by weight |
|---|---|
| | Percent |
| Gum arabic | 20 |
| Sodium silicate (liquid) | 25 |
| Ferromanganese | 15 |
| Silica flour | 10 |
| Aluminum silicate (such as kaolin) | 30 |

These are mixed and applied in the same way as that outlined in Example 1.

In either of Examples 1 and 2, a mixture of aluminum oxide and silica flour, desirably in suitable proportions to form aluminum silicate, may be substituted for the kaolin; and/or in Example 1 a mixture of magnesium oxide and silica flour, desirably in the same proportions as they exist in talc, may be substituted for the talc. I include such mixtures in the terms aluminum silicate and magnesium silicate respectively.

*Example 3*

| Ingredients | Percentage by weight |
| --- | --- |
|  | Percent |
| Gum arabic | 13 |
| Sodium silicate (liquid) | 25 |
| Ferromanganese | 6 |
| Silica flour | 26 |
| Hematite | 30 |

These are mixed and applied in the same way as that outlined in Example 1. The hematite is desirably specular hematite, although that is not necessary. Ordinary red hematite or red iron oxide may be used.

Ferromanganese is always a desirable ingredient in coating compositions. However, it is not an essential one; and it may be omitted in some instances, or it may be replaced in part or in whole by other compounds of manganese, desirably those which also contain some iron, such for instance as silicomanganese or ferrosilicon. These are all iron-manganese alloys.

The silica flour and/or the sodium silicate which are given in all three examples may be increased or diminished in amount, and the silica flour may even be omitted, as desired; for they serve to adjust the basicity of the slag which is obtained when the coated rod is used, and may be increased or decreased in amount as it is desired to decrease or increase respectively the basicity of the slag.

The liquid sodium silicate may be ordinary water-glass, which usually contains about 60% water. It may vary somewhat in the proportion of silica to sodium; and the amount of silica flour added depends somewhat on the composition of the liquid sodium silicate as well as on the amount of the sodium-silicate used. As has already been stated, sodium silicate in dry form may be used; and sufficient water is then added to make a paste of the desired consistency. Other alkali-metal silicates, such as potassium silicate, may be used in place of sodium silicate. Such alkali-metal silicates and gum arabic may be used together in many other coating mixtures besides those given in the examples.

The gum arabic is dissolved either in the sodium silicate or in water, to permeate the whole mass of paste. When the paste is dried and baked, as is done after the rod is coated with the paste, it loses water, and deposits the dissolved gum arabic through the coating in the form of a honeycomb shell or matrix which adds materially to the physical strength of the coating.

Although in all three of the examples given above I have used sodium silicate and ferromanganese and silica flour, my invention is in no way limited in its broader aspects to coatings which contain these ingredients in addition to the gum arabic. The examples given above are especially desirable where the coatings are the so-called thick coatings; although they can be used even when the coatings are only a few thousandths of an inch thick. However, for thin coatings, having a thickness of the order of a few thousandths of an inch, I prefer to use mixtures which do not include sodium silicate or silica flour or ferromanganese; but which still use the gum arabic for its advantageous properties.

*Example 4*

One example of a coating which is especially suited for thin coatings is that which is shown in the co-pending application of Paul R. Judy and myself, Serial No. 678,615, filed July 1, 1933, which has the following composition:

Titanium dioxide_____ 8 to 12 ounces.
Gum arabic_____ 4 to 12 ounces.
Water_____ 1 gallon.

This makes a thin suspension of the titanium dioxide in an aqueous solution of gum arabic. The coating is conveniently applied by dipping, wiping, or brushing, and the so-coated rod is then dried, and baked if desired, leaving on it a thin deposit of gum arabic and titanium dioxide. This particular coating containing titanium dioxide is not specifically claimed in this case, but constitutes the subject-matter of said co-pending Judy & Pennington application.

*Example 5*

Another example which is especially suitable for thin coatings is:

Parts by weight
Calcium carbonate_____ 20
Gum arabic_____ 5
Water_____ 20

The gum arabic is dissolved in the water, and the calcium carbonate is suspended in the solution of gum arabic. This suspension and solution is suitably applied to the rod, and dried; leaving a deposit of gum arabic which not only holds the calcium carbonate in place on the rod but also has the other advantageous properties of gum arabic.

*Example 6*

Another example, especially adapted for thin coatings, involves the use of at least 8 or 10% of gum arabic with compounds of strontium, cerium, and/or barium, when they are used as co-ordinators or stabilizers in welding-rod coatings which may also contain sodium silicate. The provision of strontium, cerium, and/or barium in welding-rod coatings is the invention of Paul R. Judy, and is included in the subject-matter of his application Serial No. 678,616, filed July 1, 1933, assigned to the same assignee as is my present application; and is given here merely as an example in which use may be made of gum arabic in substantial quantity in the coating.

I claim as my invention:

1. A welding rod having a flux coating of which gum arabic forms at least 8%.

2. A welding rod having a flux coating comprising gum arabic and one or more fluxing ingredients, with the gum arabic forming at least 8% of the whole.

3. A welding-rod having a flux coating comprising gum arabic and one or more slag-forming ingredients, with the gum arabic forming at least 8% of the whole.

4. A welding rod having a flux coating including at least 8% gum arabic and water-soluble sodium silicate.

5. A welding rod having a flux coating including at least 8% gum arabic and a water-soluble alkali-metal silicate.

6. A flux-coated welding rod, the coating of which includes at least 8% gum arabic, a water-soluble alkali-metal silicate, and an iron-manganese alloy.

7. A flux coated welding rod, the coating of which includes at least 8% gum arabic, a water-soluble alkali-metal silicate, an iron-manganese alloy, and aluminum silicate.

8. A flux coated welding rod, the coating of which includes at least 8% gum arabic, a water-soluble alkali-metal silicate, an iron-manganese alloy, and hematite.

9. A flux coated welding rod, the coating of which includes at least 8% gum arabic, a water-soluble alkali-metal silicate, an iron-manganese alloy, and magnesium silicate.

HARRY R. PENNINGTON.